US006866274B1

(12) United States Patent
Muscat

(10) Patent No.: US 6,866,274 B1
(45) Date of Patent: Mar. 15, 2005

(54) ARTICLE TRANSPORT DOLLY

(76) Inventor: Lewis A. Muscat, 58 Blackmere Circle, Brampton, Ontario (CA), L6W 4B4

( * ) Notice: Subject to any disclaimer, the term of this patent is extended or adjusted under 35 U.S.C. 154(b) by 83 days.

(21) Appl. No.: 10/413,606

(22) Filed: Apr. 16, 2003

(51) Int. Cl.$^7$ ................................................ B62B 1/10
(52) U.S. Cl. .................... 280/79.7; 280/63; 280/47.131; 280/47.33
(58) Field of Search ............................. 280/79.11, 79.7, 280/63, 47.131, 47.33; 414/444, 111

(56) References Cited

U.S. PATENT DOCUMENTS

| | | | |
|---|---|---|---|
| 2,816,771 A | | 12/1957 | Hunt |
| 3,717,357 A | | 2/1973 | Schaefer |
| 3,845,969 A | * | 11/1974 | Nadeau ................. 280/47.131 |
| 3,871,054 A | * | 3/1975 | Schaefer ...................... 29/267 |
| 4,270,741 A | * | 6/1981 | Hurst .......................... 269/17 |
| 4,695,067 A | | 9/1987 | Willey |
| D310,894 S | * | 9/1990 | Smith .......................... D34/23 |
| 5,048,850 A | | 9/1991 | McDonald |
| 5,284,410 A | | 2/1994 | Sare et al. |
| 5,318,316 A | * | 6/1994 | Shurtleff ..................... 280/79.7 |
| 5,373,917 A | | 12/1994 | Kamman |
| 5,378,103 A | * | 1/1995 | Rolnicki et al. ............... 414/10 |
| 5,799,959 A | | 9/1998 | Krawczyk |
| 6,234,499 B1 | * | 5/2001 | Irwin et al. ................... 280/63 |
| 6,264,184 B1 | * | 7/2001 | Armstrong et al. ........... 269/17 |
| 6,299,185 B1 | * | 10/2001 | Lewis ....................... 280/79.7 |
| 6,308,969 B1 | * | 10/2001 | Young ....................... 280/79.7 |
| 6,663,123 B1 | * | 12/2003 | Kovacs ...................... 280/79.7 |

* cited by examiner

Primary Examiner—Christopher P. Ellis
Assistant Examiner—Brian Swenson

(57) ABSTRACT

An article transport dolly for transporting sheets of drywall, glass and the like from one site location to another. The article transport dolly includes an article carrier member including a base having a top surface upon which articles can be carried; and also includes a non-slip mat member being disposed upon the top surface of the base to prevent articles from sliding thereupon; and also includes a spring plate which is a sheet of rigid material upon which the article carrier member is mounted; and further includes a carrying handle/stand being attached to the article carrier member for standing the article carrier member upon a ground and for carrying the article carrier member; and also includes a wheel assembly including an axle upon which the spring plate is securely mounted; and further includes a brake assembly including brakes being mounted to the article carrier member for braking the wheel assembly.

8 Claims, 5 Drawing Sheets

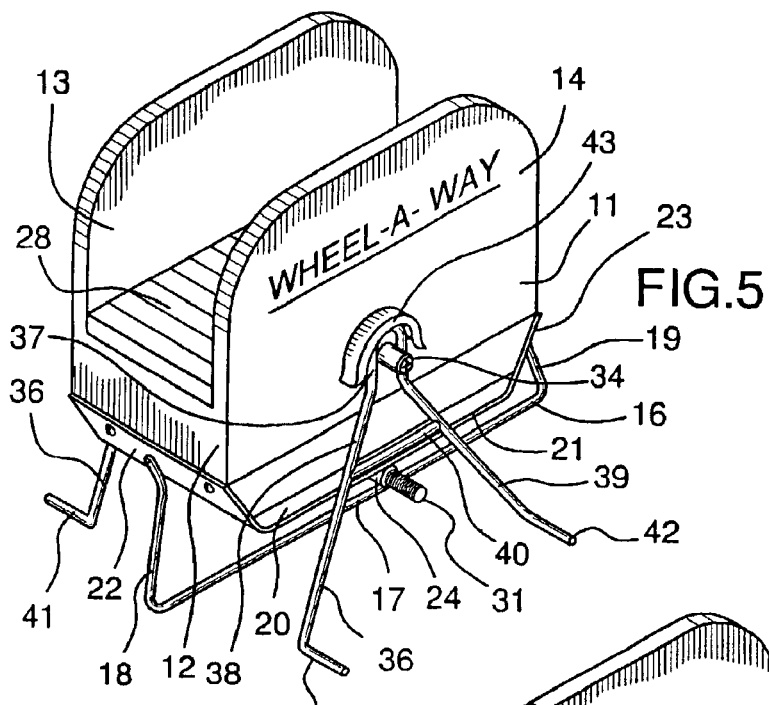
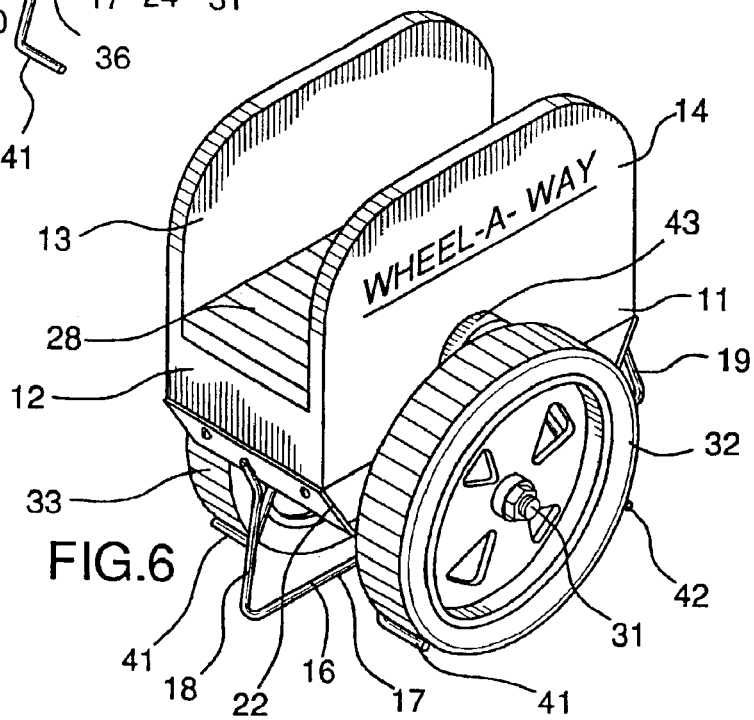

ARTICLE TRANSPORT DOLLY

BACKGROUND OF THE INVENTION

1. Field of the Invention

The present invention relates to article transports and more particularly pertains to a new article transport dolly for transporting sheets of drywall, glass and the like from one site location to another.

2. Description of the Prior Art

The use of article transports is known in the prior art. More specifically, article transports heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,717,357; U.S. Pat. No. 5,284,410; U.S. Pat. No. Des. 310,894; U.S. Pat. No. 5,048,850; U.S. Pat. No. 4,695,067; U.S. Pat. No. 2,816,771; U.S. Pat. No. 5,799,959; and U.S. Pat. No. 5,373,917.

While these devices fulfill their respective, particular objectives and requirements, the aforementioned patents do not disclose a new article transport dolly. The prior art includes wheeled carts having trailers or flatbeds upon which articles can be placed for transporting.

SUMMARY OF THE INVENTION

The general purpose of the present invention, which will be described subsequently in greater detail, is to provide a new article transport dolly which has many of the advantages of the article transports mentioned heretofore and many novel features that result in a new article transport dolly which is not anticipated, rendered obvious, suggested, or even implied by any of the prior art article transports, either alone or in any combination thereof. The present invention includes an article carrier member including a base having a top surface upon which articles can be carried; and also includes a non-slip mat member being disposed upon the top surface of the base to prevent articles from sliding thereupon; and also includes a spring plate which is a sheet of rigid material upon which the article carrier member is mounted; and further includes a carrying handle/stand being attached to the article carrier member for standing the article carrier member upon a ground and for carrying the article carrier member; and also includes a wheel assembly including an axle upon which the spring plate is securely mounted; and further includes a brake assembly including brakes being mounted to the article carrier member for braking the wheel assembly. None of the prior art includes the combination of elements of the present invention.

There has thus been outlined, rather broadly, the more important features of the article transport dolly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new article transport dolly which has many of the advantages of the article transports mentioned heretofore and many novel features that result in a new article transport dolly which is not anticipated, rendered obvious, suggested, or even implied by any of the prior art article transports, either alone or in any combination thereof.

Still another object of the present invention is to provide a new article transport dolly for transporting sheets of drywall, glass and the like from one site location to another.

Still yet another object of the present invention is to provide a new article transport dolly that is easy and convenient to use.

Even still another object of the present invention is to provide a new article transport dolly that eliminates the user from being injured due to having to carry the sheets of drywall and glass and the like.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a partial perspective view of the present invention.

FIG. 6 is a perspective view of the present invention.

DESCRIPTION OF THE PREFERRED EMBODIMENT

Figure 1:
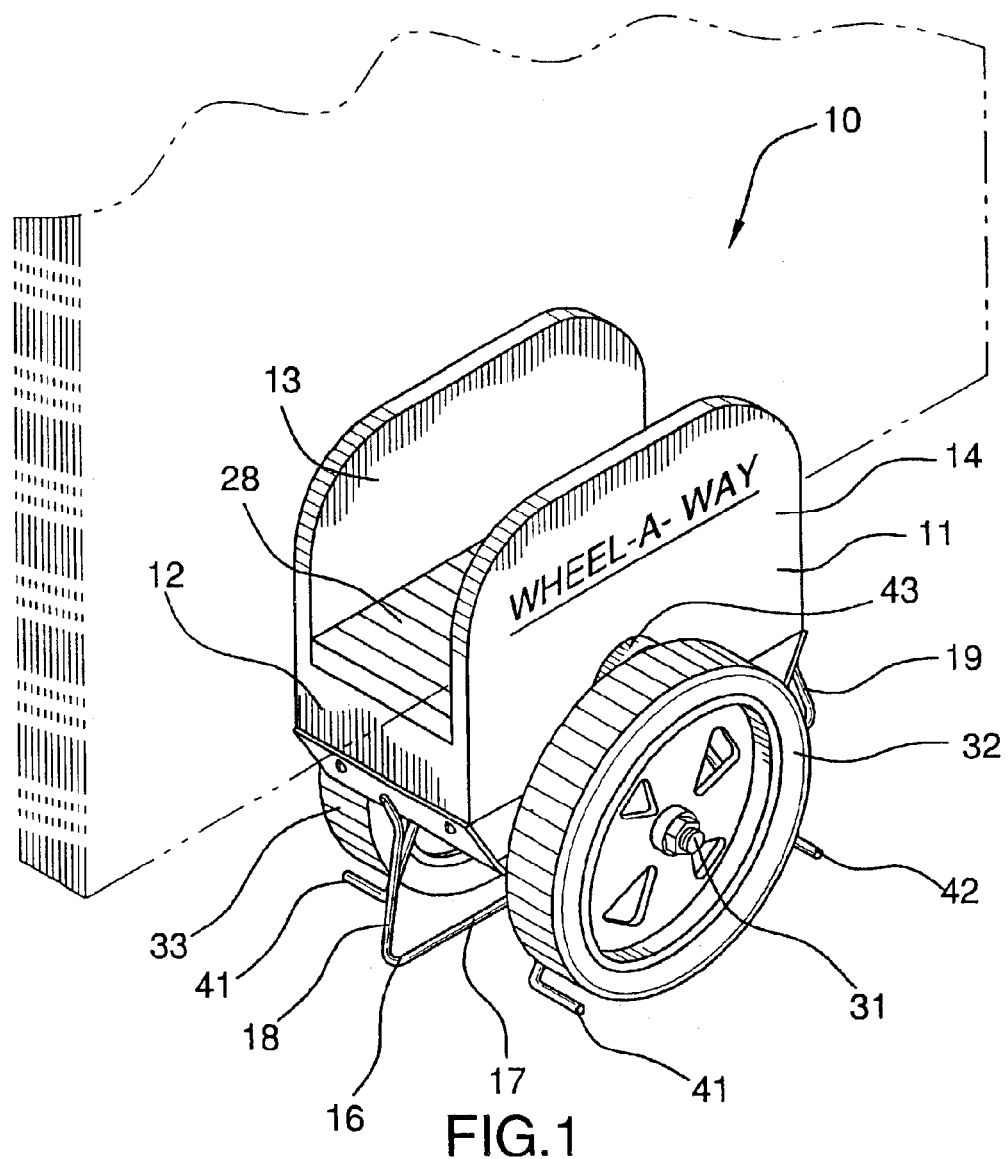
FIG. 1 is a perspective view of a new article transport dolly according to the present invention.
Figure 2:
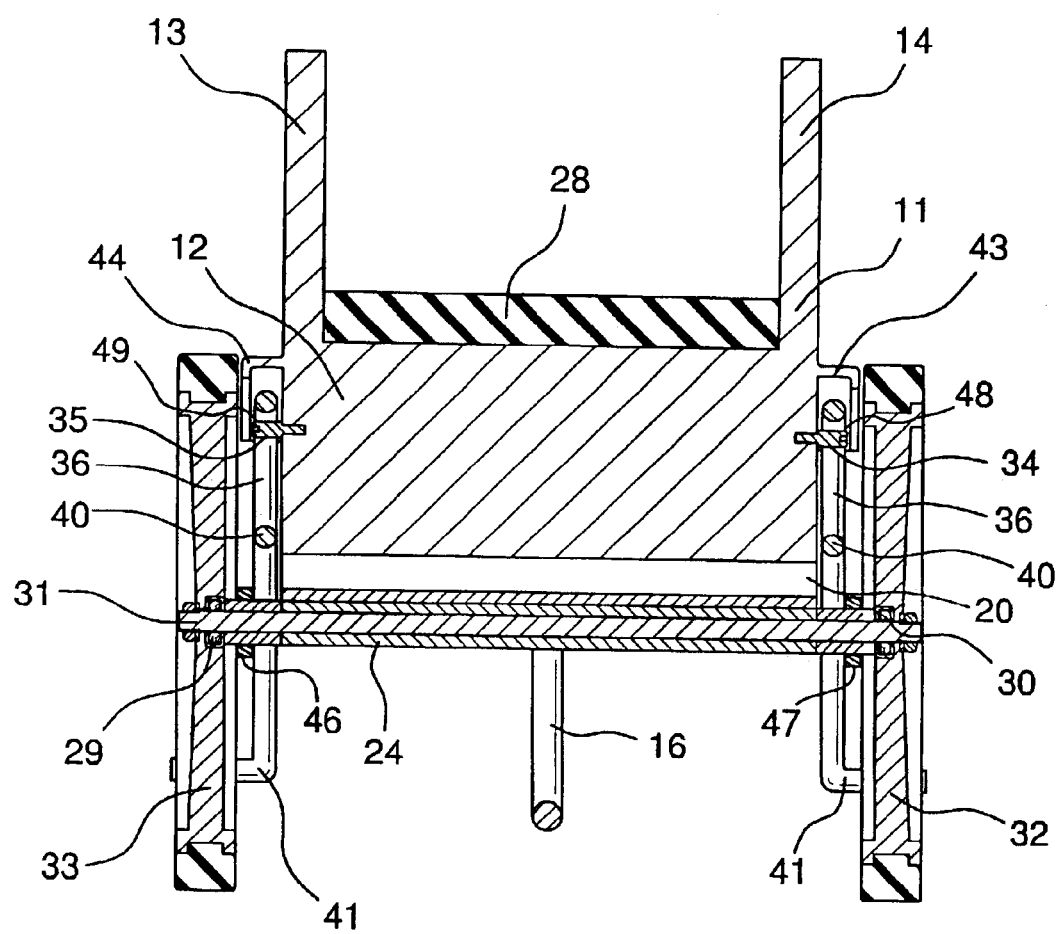
FIG. 2 is a cross-sectional view of the present invention.
Figure 3:
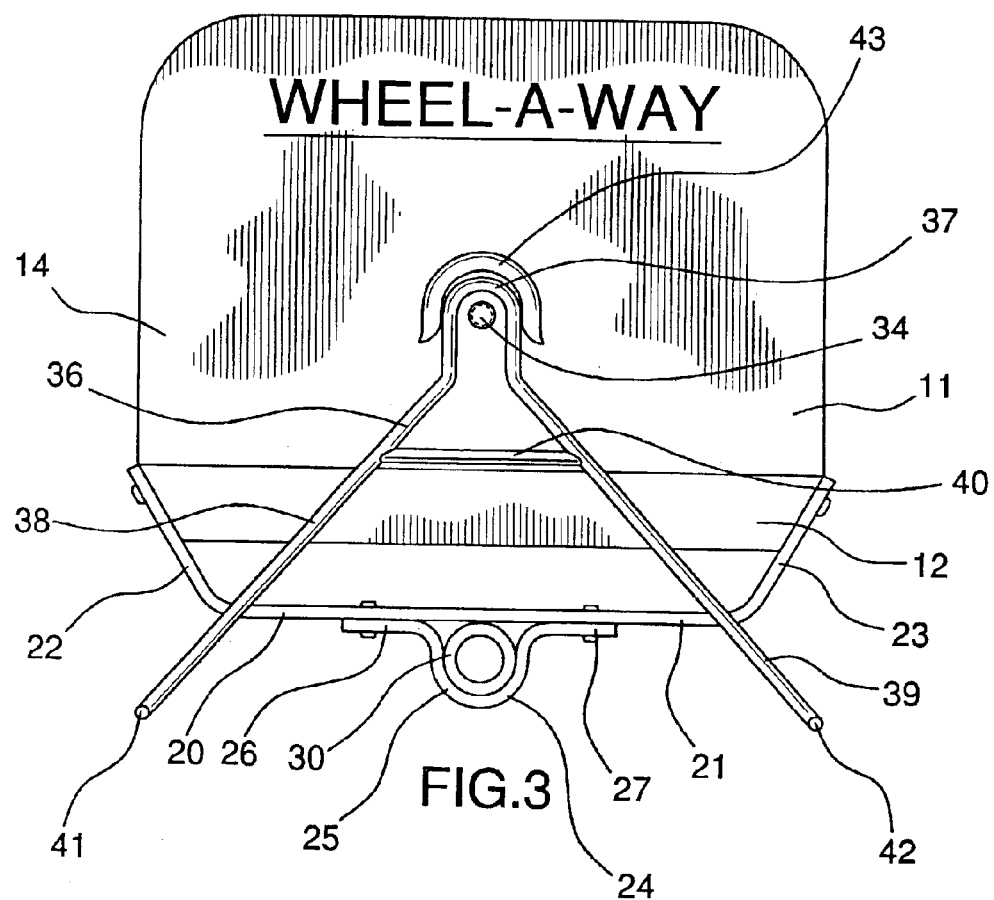
FIG. 3 is a detailed side elevational view of the present invention.
Figure 4:
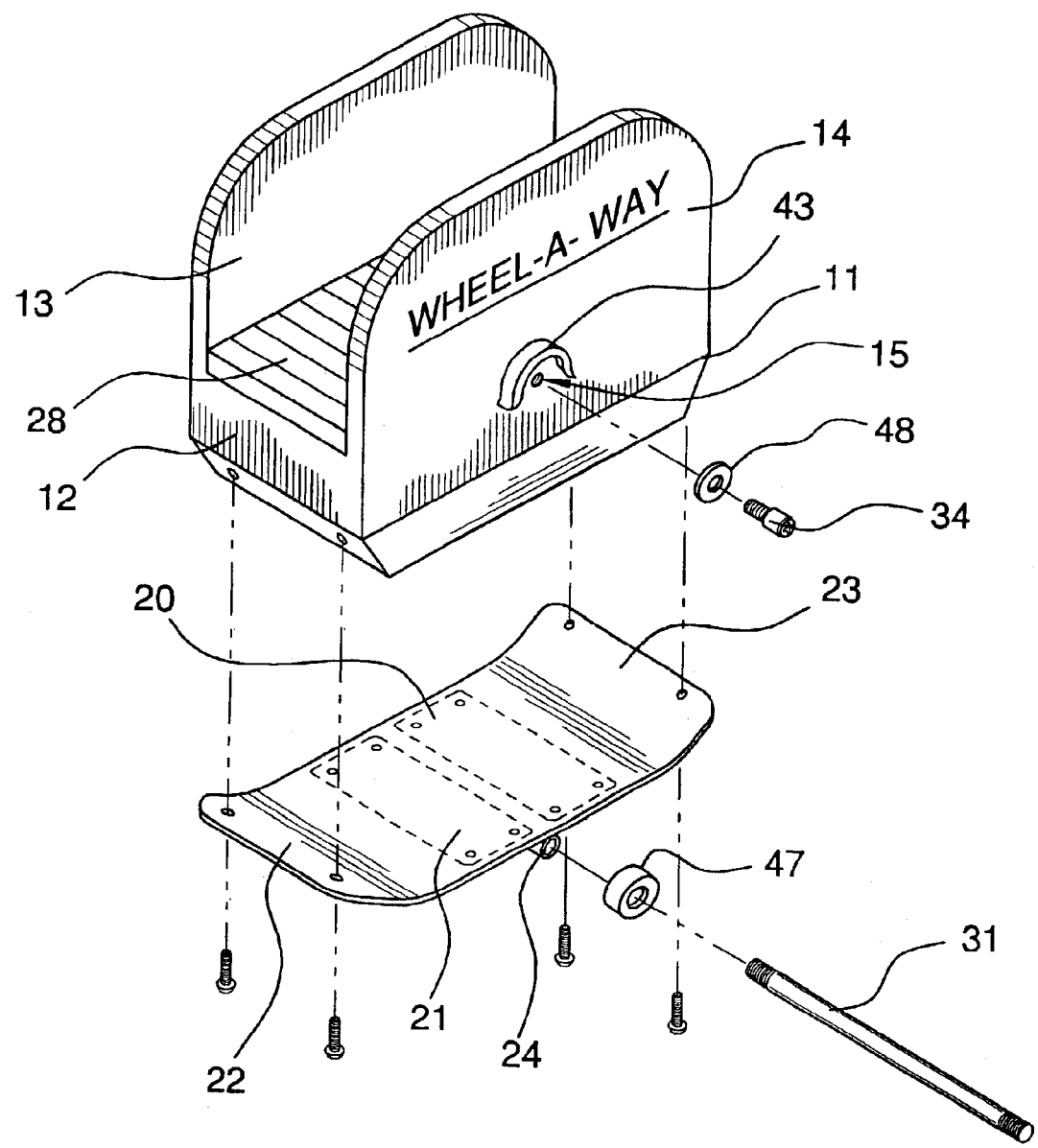
FIG. 4 is a partial exploded perspective view of the present invention.

With reference now to the drawings, and in particular to FIGS. 1 through 6 thereof, a new article transport dolly embodying the principles and concepts of the present invention and generally designated by the reference numeral 10 will be described.

As best illustrated in FIGS. 1 through 6, the article transport dolly 10 generally comprises an article carrier member 11 including a base 12 having a top surface upon which articles can be carried. The article carrier member 11 also includes side walls 13,14 being spaced apart and being conventionally attached to and extending upwardly from the top surface of the base 12. The base 12 has slots 15 being disposed therein. A non-slip mat member 28 is conventionally disposed upon the top surface of the base 12 to prevent articles from sliding thereupon.

A spring plate 20 which is a rigid sheet of material upon which the article carrier member 11 is securely and conventionally mounted has a main portion 21 and end portions 22,23 which are curved upwardly relative to the main portion 21. A carrying handle/stand 16 is conventionally attached to the article carrier member 11 for standing the article carrier member 11 upon a ground and for carrying the article carrier member 11. The carrying handle/stand 16 is generally a bar having an elongate main portion 17 and serpentine end portions 18,19 which are conventionally attached to front and back ends of the base 12 of the article carrier member 11.

A wheel assembly includes an axle 31, and also includes an axle-mounting bracket 24 being securely and conventionally attached to a bottom side of the spring plate 20 with the axle 31 being supported upon the bracket 24, and further includes bearings 29,30 being conventionally engaged to the bracket 24 with the axle 31 being journaled through the bearings 29,30. The wheel assembly further includes wheels 32,33 having spokes and being conventionally mounted to ends of the axle 31 and with wheel spacers 46,47 being supported upon the axle 31 to either side of the article carrier member 11. The bracket has a U-shaped intermediate portion 25 and planar end portions 26,27 which are conventionally fastened to the spring plate 20.

A brake assembly includes brakes which are conventionally mounted to the article carrier member 11 for braking the wheel assembly. The brake assembly also includes retaining washers 48,49 being supported upon support pins 34,35 which are securely and conventionally disposed in the slots 15 of the side walls 13,14 of the article carrier member 11, and further includes brake base attachment members 43,44 being securely and conventionally attached about the slots 15 in the side walls 13,14. Each of the brake members includes an A-shaped lever 36 being pendularly supported upon a respective support pin 34,35 and a retaining washer 48,49, and also includes wheel engagement members 41,42 being integrally attached to and extended from ends of the A-shaped lever 36 and being engageable to a respective wheel 32,33. Each of the A-shaped levers 36 includes an elongate shaft having an inverted U-shaped intermediate portion 37 being carried upon a respective support pin 34,35 that are journaled through the retaining washers 48,49, and also having generally straight first and second portions 38,39 extending at angles from the inverted U-shaped intermediate portion 37, and further having a crosspiece 40 conventionally intersecting the first and second portions 38,39. The wheel engagement members 41,42 are stub shafts extending outwardly generally perpendicular to the first and second portions 38,39 of the A-shaped levers 36.

In use, the wheel engagement members 41,42 are engaged to the outer sides of the wheels 32,33 and become disengaged from the wheels 32,33 upon the user placing sheets of drywall and glass and the like upon the non-slip mat member 28. The user moves the article transport dolly 10 from one location to another location to conveniently move the sheets of articles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the article transport dolly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An article transport dolly comprising:
    an article carrier member including a base having a top surface upon which articles can be carried, said article carrier member also including side walls being spaced apart and being attached to and extending upwardly from the top surface of said base, said base having slots being disposed therein;
    a non-slip mat member being disposed upon said top surface of said base to prevent articles from sliding therefrom;
    a spring plate upon which said article carrier member is mounted, said spring plate having a main portion and end portions which are curved upwardly relative to said main portion;
    a carrying handle/stand being attached to said article carrier member for standing said article carrier member upon a ground and for carrying said article carrier member;
    a wheel assembly including an axle upon which said spring plate is securely mounted; and
    a brake assembly including brake members being mounted to said article carrier member for braking said wheel assembly.

2. The article transport dolly as described in claim 1, wherein said carrying handle/stand is generally a bar having an elongate main portion and serpentine end portions which are attached to front and back ends of said base of said article carrier member.

3. The article transport dolly as described in claim 2, wherein said wheel assembly also includes a bracket being securely attached to a bottom side of said spring plate with said axle being supported by said bracket, and further includes bearings being engaged to said bracket with said axle being journaled through said bearings, said bracket having a U-shaped intermediate portion and planar end portions which are fastened to said spring plate.

4. The article transport dolly as described in claim 3, wherein said wheel assembly further includes wheels having spokes and being mounted to ends of said axle to either side of said article carrier member.

5. The article transport dolly as described in claim 4, wherein said brake assembly includes support pins and retaining washers being securely disposed in said slots of said side walls of said article carrier member, and further includes brake base attachment members being securely attached about said slots in said base.

6. The article transport dolly as described in claim 5, wherein each of said brake members includes an A-shaped lever being pendularly supported upon a respective said support pin that is journaled through a respective said retaining washer, and also includes wheel engagement members being attached to and extended from ends of said A-shaped lever and being engagable to a respective said wheel.

7. The article transport dolly as described in claim 6, wherein each of said A-shaped levers includes an elongate shaft having an inverted U-shaped intermediate portion being carried upon a respective said support pin that is journaled through a respective said retaining washer, and also having generally straight first and second portions extending at angles from said inverted U-shaped intermediate portion, and further having a crosspiece intersecting said first and second portions.

8. The article transport dolly as described in claim 7, wherein said wheel engagement members are stub shafts extending outwardly generally perpendicular to said first and second portions of said A-shaped levers.

* * * * *